Figure 1:
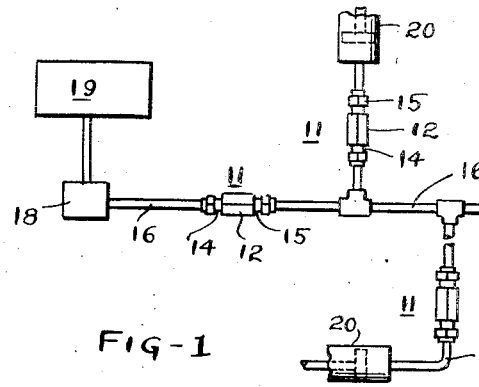

July 30, 1946.       C. R. SACCHINI       2,404,924
FLUID CONTROL APPARATUS
Filed Jan. 29, 1943

INVENTOR
COLUMBUS R. SACCHINI
BY
George M. Soule
ATTORNEY

Patented July 30, 1946

2,404,924

UNITED STATES PATENT OFFICE 2,404,924

FLUID CONTROL APPARATUS

Columbus R. Sacchini, Euclid, Ohio, assignor to The Marquette Metal Products Company, Cleveland, Ohio, a corporation of Ohio Application January 29, 1943, Serial No. 473,911

3 Claims. (Cl. 277—45)

This invention relates to a safety stop valve mechanism or fluid fuse arranged to be interposed in a fluid pressure conduit between a source of fluid supply and a fluid operated translating device and operable for controlling automatically the flow of fluid through the conduit in response to the rate of flow of the fluid. More particularly the invention relates to a fluid fuse having means operable in response to the rate of flow of fluid through the fuse to stop the flow if the rate of flow increases to a value indicative of abnormal condition.

In accordance with the illustrated embodiments of the invention herein disclosed, the means responsive to the rate of fluid flow for effecting stoppage of fluid flow comprises relatively movable valve members which operate to a closed position in response to the force of fluid friction on a wall of an annular restricted metering orifice having a gradually varying diameter, i. e. a tapered annular orifice.

The invention is particularly suitable for use with hydraulic systems wherein a liquid under pressure from a suitable fluid pressure apparatus such as a pump or storage tank is utilized to effect operation of a mechanism at a considerable distance from the source of fluid pressure. One application of this type of hydraulic system and one with which the present invention may be readily combined to great advantage is in the operation of various movable devices on aircraft such, for example, as the retractable landing gear. In aircraft hydraulic systems a suitable liquid, such as oil, under high pressure is supplied from a motor or engine driven pump through conduits to servo-motors which operate the landing gear mechanism or other devices. While the aircraft is in flight, one or more of the conduits may become broken, as by a defect or shell fire, resulting in a loss of much if not all of the fluid in the system. This loss renders repairs during the flight impossible and, since many essential control and navigational devices may derive their motivating force from the same hydraulic system, is apt to result in loss of the aircraft.

Breaking or puncturing of a conduit in such aircraft hydraulic systems immediately causes an increase in the rate of flow of the liquid therein, and, if the fluid fuse of the present invention is incorporated in the system between the pump and the point of leakage, the increase in the rate of flow causes an increase in the force of fluid friction on a sliding valve member which thereupon moves to a closed position and stops any further flow of liquid from the pump to the damaged section of the conduit and thereby prevents excessive loss of liquid from the system. In accordance with the illustrated embodiments, the sliding valve member defines one wall of an annular restricted metering orifice of uniform width but of decreasing diameter in the direction of fluid flow and the frictional force of the flowing fluid on the valve member tends to move the member to a closed position against the bias of a calibrated spring. In event the rate of fluid flow increases above a value predetermined by the size of the orifice and the calibration of the spring, the frictional force of the fluid on the movable valve member moves to a closed position stopping further flow of fluid through the fuse.

If the increased rate of flow of the liquid is due to the breaking of a conduit, the broken conduit may be repaired or isolated by suitable valves and the fuse reset to open position for resumption of normal operation of the system since the fuse prevents the loss of an excessive amount of liquid. To reset the fuse it is merely necessary to stop the pump or otherwise relieve the pressure against the fuse for an instant. An auxiliary valve is automatically rendered operable upon a predeterminable drop in this pressure to prevent flow of the liquid past the fuse until pressure is again applied, so that, if the pressure against the fuse is reduced before the break is repaired, no bleeding or additional loss of the liquid results.

An object of the invention is to provide an improved automatic stop valve mechanism or fluid fuse.

Another object is to provide a fluid fuse responsive only to the rate of fluid flow for stopping the flow.

A correlative object is to provide a fluid fuse responsive only to the rate of fluid flow, which fuse is adapted to be readily inserted in the usual fluid supply conduits of common hydraulic systems.

Another object is to provide a fluid fuse which can be reset without dismantling or disturbing the adjustment.

A correlative object is to provide a fluid fuse which can be reset automatically from a point remote from the fuse but without opening a free fluid path through the fuse.

A further correlative object is to provide a fluid fuse which can be reset by relieving the pressure against the fuse without necessitating an auxiliary valve or other means outside of the fuse to prevent flow of fluid through the fuse upon reduction of supply pressure.

Still another object is to provide a fluid fuse of the above indicated character which is small and compact, of rugged construction, and comprises a small number of parts each of which is simple to manufacture.

Another object is to provide a fluid fuse operable to a closed position due to friction of fluid at a tapered annular metering orifice.

Yet another object is to provide a fluid fuse having means for readily adjusting its sensitivity without disturbing the setting of its operating value.

Figure 2:
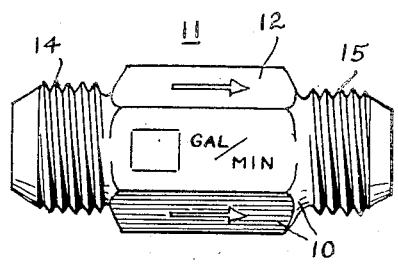
Figure 3:
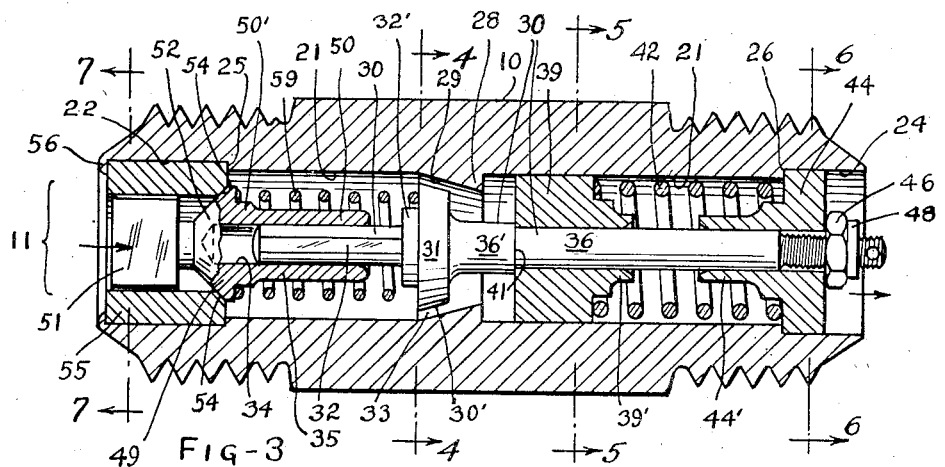
Figure 4:
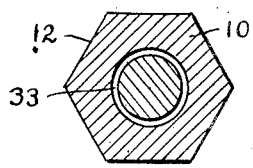
Figure 8:
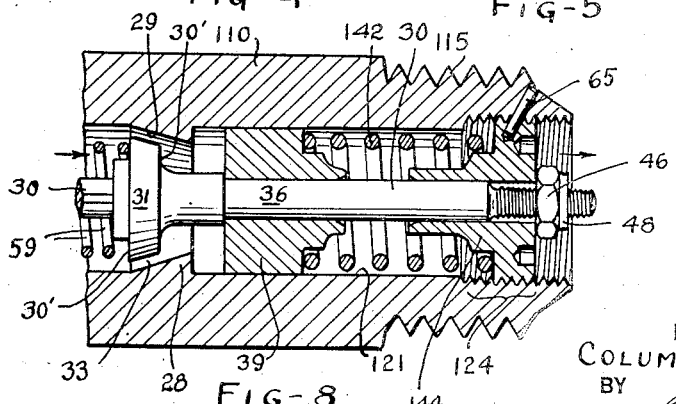

Other objects and advantages will become apparent from the following specification, wherein reference is made to the drawing in which Fig. 1 is a diagrammatic representation of a hydraulic control system incorporating the automatic fluid fuse of this invention; Fig. 2 is an elevational view of the automatic fluid fuse; Fig. 3 is a longitudinal sectional view of the fuse of Fig. 2; Figs. 4, 5, 6 and 7 are sectional views taken generally along lines 4—4, 5—5, 6—6 and 7—7, respectively, of Fig. 3, and Fig. 8 is a fragmentary longitudinal sectional view showing a modification.

Referring to the drawing, a unitary tubular body or housing 10 of the hydraulic fuse 11 of this invention has (e. g.) a hexagonal portion 12 intermediate a pair of externally threaded cylindrical end portions 14 and 15 which are adapted to be screwed respectively into complementary tube couplings on spaced ends of suitable fluid supply conduits 16 as shown more or less diagrammatically in Fig. 1. The fluid in the conduits 16 normally flows freely through the fuses 11 from a pump 18 arranged to force fluid from a reservoir 19 to a plurality of hydraulic servomotors 20 such as commonly used to actuate various subservient devices, e. g. retractable landing gear mechanisms. Upon the occurrence of an abnormal rate of fluid flow through one of the fuses 11 such as would occur upon the breaking of a conduit beyond the fuse, the fuse operates automatically to stop further fluid flow and consequent loss of fluid. On military combat aircraft, because of the great likelihood of enemy fire severing the conduits 16 it is desirable that the fuses 11 be spaced at short intervals to protect as completely as possible the fluid system from loss of fluid. The protection afforded by the fuses 11 when so arranged permits repairs to be made during flights, prevents total disability of the hydraulic system by the breaking of a single conduit, and greatly reduces the fire hazard which would result from leaking oil.

The tubular housing 10 of the fuse 11 has its central opening 21 (Fig. 3) counterbored at both ends as indicated at 22 and 24 to provide annular shoulders 25 and 26, respectively. An inward peripheral projection 28 narrows the opening 21 intermediate the ends of the housing 10 and defines a frusto-conical valve seat surface 29 which tapers inwardly or converges in the direction of fluid flow indicated by the arrows. A valve plunger 30 is provided at an enlarged central portion 30' with a peripheral face portion 31 complementary to and adapted to seat upon the valve seat surface 29 when the plunger 30 is moved to the right from the position in which shown. When the plunger 30 is in its normal or open position, shown in the drawing, the valve seat surface 29 and the face portion 31 are spaced apart to define a tapered annular orifice 33 (see Fig. 4), that is, an orifice of uniform width but of gradually decreasing diameter in the direction of fluid flow. The plunger 30 has a generally cylindrical upstream stem portion 32 of reduced diameter and provided with fluid venting "flats," said stem portion 32 being slidably received within a complementary longitudinal bore 34 in a cut-off valve plunger 35 (to be described later). A cylindrical downstream stem portion 36 of the plunger 30 passes through a central opening in an axially movable spring guide 39.

Figures 5, 6, 7:
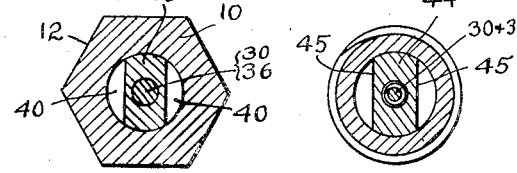

The spring guide 39 is slidably received within the opening 21 downstream from the valve seat surface 29 and is of generally rectangular transverse cross section. As indicated in Fig. 5 the cross section of the guide 39 deviates from a true rectangle in that the shorter sides are curved to conform with the inner wall of the housing 10 to define therewith a pair of circular segmental orifices 40. The guide 39 operatively abuts an annular shoulder 41 on the valve plunger 30 provided by a portion 36' of increased diameter between the stem portion 36 and the central portion 30'.

The valve plunger 30 is normally biased to fully open position by a helical spring 42 interposed between the guide 39 and a spring support 44 press fitted or otherwise secured fixedly in the counterbored portion 24 of the opening 21 against the shoulder 26. The support 44 has a transverse cross section similar to that of the guide 39 as shown in Fig. 6 and defines with the inner wall of the housing 10 a pair of circular segmental orifices 45. The ends of the spring 42 rest respectively in shouldered recesses provided by opposing tubular end portions 39' and 44' of the guide 39 and the support 44, respectively which end portions may be of circular section.

The stem portion 36 of the valve plunger 30 extends slidably through the central opening in the support 44 and is threaded at its outer end to receive an adjusting nut 46 which may be secured in adjusted position as by spot-welding a washer 48 to the stem portion 36. The adjusted position of the nut 46 determines the size of orifice 33 when the plunger 30 is in its normal open position and, as will be described hereinafter, thus determines the critical rate of fluid flow which causes the plunger 30 to move to its closed position. The rate of fluid flow for which the adjustment is made can be stamped on the housing 10 to indicate the protective point of the fuse 11.

The cut-off valve plunger 35 has a central frusto-conical portion 49 intermediate oppositely extending stem portions 50 and 51 and the peripheral surface 52 thereof is arranged to seat upon a complementary valve seat surface 54 provided at the inner end of a tubular cut-off valve seat member 55 slidably received within the counterbored portion 22 of the opening 21 against the shoulder 25. The valve seat member 55 is suitably retained in position as by spinning over the tapered end of the threaded portion 14 of the housing 10 as indicated at 56. The downstream stem portion 50 is a cylinder of lesser diameter than the base of the frusto-conical portion 49 to which it is joined by a cylindrical portion 50' of intermediate diameter and has the longitudinal bore 34 in which the stem portion 32 of the valve plunger 30 is slidably received. The upstream stem portion 51 (see Fig. 7) has a cross section similar to that of the spring guide 39 and is slidably received within the circular opening in the valve seat member 55 and defines with the walls thereof a pair of circular segmental orifices 58, Fig. 7.

A helical spring 59 which is weaker than the spring 42 is interposed between the valve plungers 30 and 35 and normally biases the valve plunger 35 to its fully closed position on the valve seat member 55 as shown in Fig. 3. The ends of the spring 59 rest respectively in annular shouldered recesses provided by the portion 50' of the plunger 35 and a similar portion 32' between the stem portion 32 and the portion 30' of the valve plunger 30.

The operation of the fluid fuse will be explained by considering that a single fuse 11 is inserted in the conduits 16 between the pump 18 and the hydraulic cylinders 20, the operation of a system with more than one fuse as illustrated in Fig. 1 being apparent therefrom. Fluid pressure due to operation of the pump exerted on the frusto-conical portion 49 of the cut-off valve plunger 35 causes the plunger 35 to move away from its seated position on the seat member 55 against the bias of the spring 59 and thereby effects opening of an annular orifice between the complementary surfaces 52 and 54. Fluid is now free to flow from the pump 18 through the fuse 11 to effect operation of any or all of the servo-motors 20. It should be noted from the drawing that with the plunger 35 open and the plunger 30 in its normal position a restricted but unobstructed fluid path exists through the fuse 11.

Due to the inertia of the moving parts of the servo-motors 20 and the resistance of the mechanisms operated thereby, the rate of flow of the fluid through the fuse 11 normally does not exceed a predetermined value. In event of a broken or punctured conduit between the fuse 11 and the servo-motors, however, the rate of flow of fluid through the fuse 11 quickly exceeds the predetermined value. When the fluid is flowing through the tapered annular orifice 33 at a rate in excess of the predetermined value, the frictional force resulting from the action of the fluid on the conical surface 31 causes the valve plunger 30 to move toward its closed position against the bias of the spring 42. As the plunger 30 moves, the orifice 33 becomes smaller and the fluid friction correspondingly increases resulting in further movement of the plunger 35 and eventual seating of the surface 31 on the surface 39 with a snap action, closing the orifice 33 and trapping all of the fluid in the system between the pump 18 and the fuse 11. As thus described, the fuse 11 has performed its main function of preventing excessive fluid loss due to a broken conduit. When two or more fuses are connected in series in a conduit system, the sensitivity or setting of the fuses may be chosen so that the fuse closest to the broken conduit operates first so that if possible a part only of the system may be shut off, much in the manner of overload protection commonly applied to electrical power distribution systems.

After the valve plunger 30 has moved to its closed position, the fluid trapped between the pump 18 and the fuse 11 is under high pressure and, so long as the pump 18 continues to operate, pressure on the portion 39' maintains the plunger 30 in its closed position. Extensive experiments have shown that whereas the plunger 30 is retained in closed position due to fluid pressure, fluid pressure has no effect on its closing operation which is entirely dependent upon the friction force of the fluid passing through the tapered orifice 33. If the pump 18 should stop for any reason, the trapped fluid cannot escape since the valve plunger 35 returns to its closed position, the spring 59 having a sufficient biasing force to close the plunger 35 against the hydraulic head existing when the pump 18 is not operating. Closure of the valve plunger 35 of course permits opening of the orifice 33 due to the bias of the spring 42 on the plunger 30. Thus the fuse 11 may be reset to normal position, after it has operated, merely by the pilot of the plane stopping the pump for an instant, which may be done after the broken conduit has been repaired or by-passed.

It is thus seen that no manipulation or dismantling of the fuse 11 is required for resetting, this operation being performed by hydraulically acting means under the control of the pilot. The fuse 11 may therefore be mounted in any position in the system whether readily accessible or not. Besides permitting quick re-use of the hydraulic system after the breaking of a conduit while still in flight, the semi-automatic resetting feature is extremely valuable also because of the possibility of surges in the system being sufficiently great to cause operation of the fuse. In such event all that need be done is to stop or short circuit the pump for an instant in order to return the fuse to its normal position and then to restart or recondition the pump and the system is again ready for use.

Fuses having various degrees of sensitivity, that is various speeds of response, can be manufactured by varying the degree of taper of the complementary surfaces 29 and 31. By making the taper of these surfaces less gradual, the fuse becomes more sensitive in its operation. For use in systems subject to repeated surges, a fuse of low sensitivity is apt to be most suitable since if the surge is not very great and ends before the orifice 33 is closed resetting of the fuse is not required. The sensitivity of the fuse is also dependent upon the rate of the springs 42 and 59; and thus a wide range of sensitivities is possible by various combinations of taper and spring rate.

The rates of the springs 42 and 59 depend upon the design of the respective springs and thus fuses of various sensitivities can be manufactured by choosing certain springs during assembly. Another method of predetermining sensitivity during manufacture of the fuse is shown by the modified construction of Fig. 8.

In Fig. 8, wherein similar parts are referred to by the same numerals as in the other figures plus 100, the counterbored portion 124 of the opening 121 in the housing 110 is threaded and receives a complementary threaded spring support 144. The threaded connection between the housing 110 and support 144 provides a means for adjusting the sensitivity of the fuse by varying the length and consequently the rate of the spring 142. When the support 144 is in the proper position for the desired sensitivity, it may be suitably secured against further rotation as by a locking pin 65 inserted in a hole drilled through the conical end of the portion 115 and into the support 144. If it should be desirable to provide for variation of the sensitivity of the fuse after manufacture, a suitable set screw may replace the locking pin 65 and be arranged for screwing through a tapped opening in the portion 115 against the support 144.

I claim:

1. In a fluid fuse, a casing having a passage extending therethrough from end to end, a valve means comprising a frusto-conical valve seat surface in said passage intermediate its ends and a valve plunger slidably mounted in said passage for axial movement with respect to said casing, said plunger having a frusto-conical face portion complementary to and adapted to seat upon said seat surface and when so seated closing the passage through said casing, biasing means normally biasing said face portion and said valve seat surface apart to define a tapered annular orifice, the biasing force of said biasing means being less than the axial frictional force of said fluid on said face portion when fluid flows at a rate above a predetermined value through said tapered orifice, whereby said orifice is closed by said fluid friction when the rate of flow of fluid through said orifice exceeds said predetermined value, and a second valve means contained within said passage in series with said first mentioned valve means, said second valve means being normally biased to a closed position and movable to an open position in response to fluid pressure.

2. In a fluid fuse, a casing having a passage extending therethrough from end to end, one end being an inlet and the other end being an outlet for fluid flowing through said passage, a valve means comprising a frusto-conical valve seat surface in said passage intermediate its ends and a valve plunger slidably mounted in said passage for axial movement with respect to said casing, said plunger having a frusto-conical face portion complementary to and adapted to seat on said valve seat surface and when so seated closing the passage through said casing, biasing means normally urging said face portion and said valve seat apart to define an annular orifice tapered in the direction of fluid flow, the biasing force of said biasing means being less than the axial frictional force of said fluid on said face portion when fluid flows at a rate above a predetermined value through said tapered orifice, whereby said orifice is closed by said fluid friction when the rate of flow of fluid exceeds said predetermined value, and a second valve means contained within said passage in series with said first valve means between said first valve means and said inlet, said second valve means being normally biased to a closed position and movable to an open position in response to fluid pressure.

3. A fluid fuse comprising a casing having a passage extending therethrough from inlet to outlet, a frusto-conical valve seat forming part of said passage located between said inlet and outlet and converging toward the outlet, a plunger guided for axial movement in the passage and having a frusto-conical head portion complementary to said seat and surrounded thereby normally spaced sufficiently near the seat so that the head tends to be moved against the seat by friction of fluid en route through the passage toward the outlet, a pair of springs of different strength acting oppositely axially on the plunger, the stronger of the springs normally maintaining the frusto-conical surfaces spaced apart as stated, and a valve in the inlet normally closed by the weaker of the two springs and opened by fluid pressure at the inlet.

COLUMBUS R. SACCHINI.